United States Patent [19]

Linke et al.

[11] Patent Number: 5,275,649
[45] Date of Patent: Jan. 4, 1994

[54] DOPED ZIRCONIUM MIXED SILICATE PIGMENT, METHOD FOR THE PREPARATION THEREOF AND PRODUCTS CONTAINING SUCH PIGMENT OR A THUS PREPARED PIGMENT

[75] Inventors: Erich A. E. Linke, Köln, Fed. Rep. of Germany; Cornelis H. Zwart, Schijndel, Netherlands; Adrianus D. Smout, Essen, Belgium

[73] Assignee: ColoRSil B.V., Schijndel, Netherlands

[21] Appl. No.: 19,054

[22] Filed: Feb. 18, 1993

[30] Foreign Application Priority Data

Feb. 18, 1992 [NL] Netherlands .................. 9200293

[51] Int. Cl.$^5$ .............................................. C08K 3/00
[52] U.S. Cl. ................................. 106/451; 106/481; 501/18; 501/21; 501/32
[58] Field of Search ............ 106/451, 481; 501/17, 501/18, 21, 32

[56] References Cited

U.S. PATENT DOCUMENTS

| | | | |
|---|---|---|---|
| 2,441,447 | 6/1947 | Seabright | 106/451 |
| 2,992,123 | 7/1961 | Seabright | 106/451 |
| 3,012,898 | 12/1961 | Seabright | 106/451 |
| 3,025,178 | 3/1962 | Seabright | 106/451 |
| 3,168,410 | 2/1965 | Bruneau | 106/451 |

FOREIGN PATENT DOCUMENTS

| | | |
|---|---|---|
| 661595 | 7/1965 | Belgium . |
| 1910008 | 9/1969 | Fed. Rep. of Germany . |
| 1197669 | 12/1959 | France . |
| 1289796 | 2/1962 | France . |
| 1458059 | 10/1966 | France . |
| 2238689 | 2/1975 | France . |

OTHER PUBLICATIONS

Chemical Abstracts, vol. 100, No. 14, Apr. 2, 1984, Columbus, Ohio Abstract No. 108203r "Ceramic Pigment".

*Primary Examiner*—Karl Group
*Assistant Examiner*—Chris Gallo

[57] ABSTRACT

A new doped zirconium mixed silicate pigment has been found, having a particle size $D_{50}$ of 3 μm or less and a molar ratio of zirconium dioxide/silicon dioxide that deviates from the stoichiometric ratio and is in the range of 1/1.5–1/36. This new pigment is doped with 1–25% by weight of a color-providing metal oxide an exhibits great color strength as well as good thermostability. The new pigment, which has a very high particle fineness, can be used for ceramic applications and for coloring glass, but is also particularly suitable for applications outside the ceramic field, in particular as a colorant in plastics, rubber, paint, printing ink and cosmetic products. Further, a similar new doped zirconium silicate pigment has been found, which, however, has a $D_{50}$ particle size that is greater than 3 μm, the molar ratio of zirconium dioxide/silicon dioxide being in the range of 1/4.9–1/36. The last-mentioned pigment is very suitable to be incorporated into glass.

24 Claims, 1 Drawing Sheet

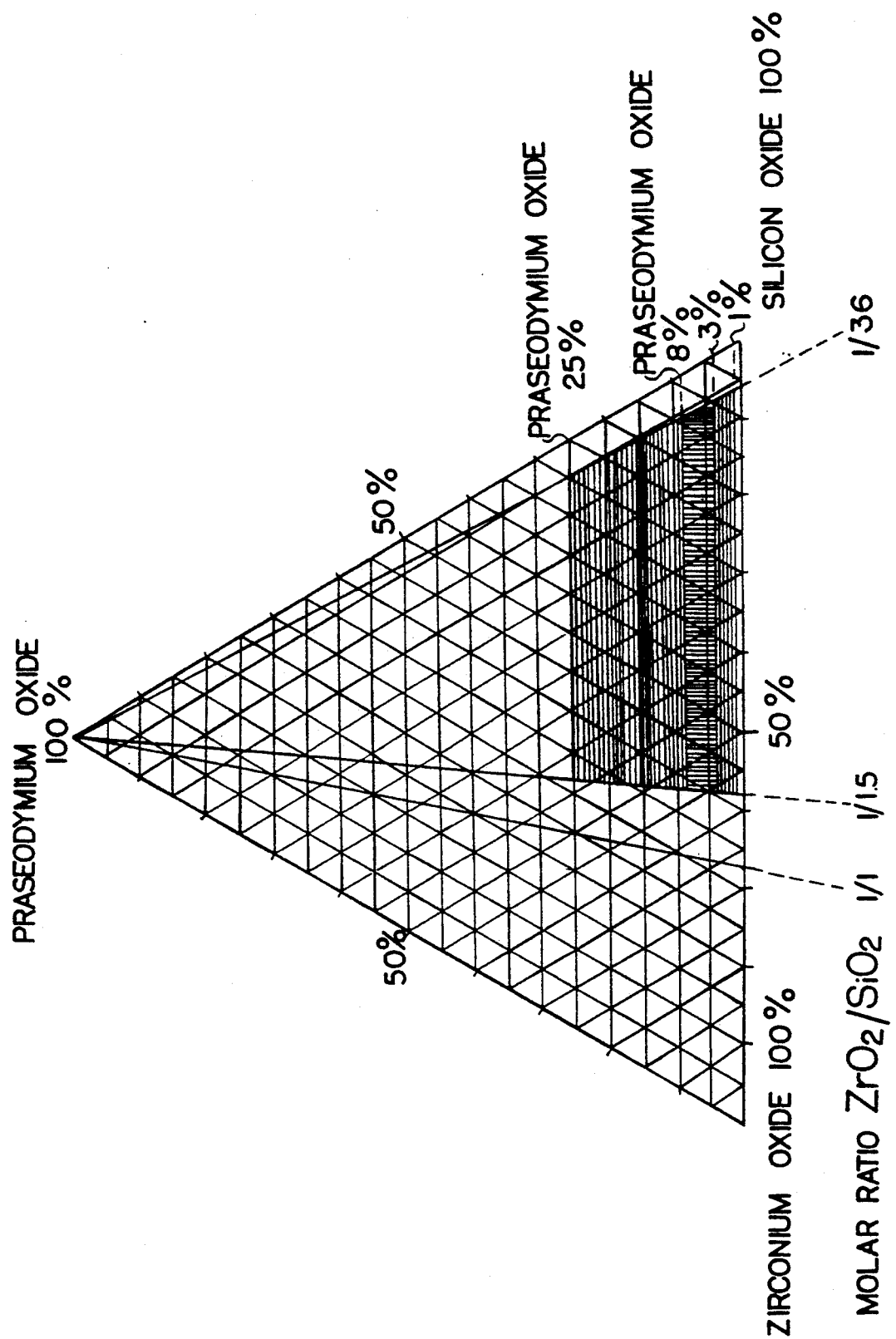

DOPED ZIRCONIUM MIXED SILICATE PIGMENT, METHOD FOR THE PREPARATION THEREOF AND PRODUCTS CONTAINING SUCH PIGMENT OR A THUS PREPARED PIGMENT

This invention relates to a doped zirconium mixed silicate pigment. Inorganic colorants based on doped zirconium silicate are known, for instance yellow praseodymium-containing zirconium silicates. These known inorganic colorants are all so-called ceramic colorants, this qualification meaning that those colorants exhibit good thermostability at high temperatures of, for instance, 1000° C. and higher, so that they can be incorporated into a ceramic melt or glaze melt without their color strength being lost or, at any rate, deteriorating considerably.

Ceramic zirconium silicate colorants owe their high thermostability to the structure of the $ZrSiO_4$ crystal, on the one hand, and to their particle size, on the other.

In all known ceramic zirconium silicate colorants, the molar ratio $ZrO_2/SiO_2$ is about 1/1, in accordance with a crystal structure that is generally accepted in the art and is specified, for instance, in "Classification and Chemical Description of the Complex Inorganic Color Pigments", published by the Dry Color Manufacturers' Association (DCMA), Alexandria, Va., U.S.A., 3rd edition, 1991, page 66. Sometimes there is a slight excess of $SiO_2$, for which there is in fact no room in the specified crystal structure. It is generally supposed that even a relatively slight excess of $SiO_2$ causes the colorant to dissolve more readily in a glaze melt, so that the colorant disintegrates and loses color strength. Such a colorant is therefore less suitable for ceramic applications and this explains why all zirconium silicate colorants that are described in the literature or are commercially available contain less than 1.3 mol $SiO_2$ per 1 mol $ZrO_2$.

Further, as stated, the particle size is of importance for the thermostability. The known ceramic zirconium silicate colorants have a particle size of at least about 10 $\mu$m and still contain a considerable proportion of larger particles, for instance of a size of from 20 to as much 50 $\mu$m. A relatively large particle size is necessary to slow down the deterioration and dissolution of the colorants during the firing of a normal glaze as much as possible and thereby to maintain the initial color strength of the colorants as much as possible.

According to the prior art, ceramic zirconium silicate colorants as described hereinabove are prepared by mixing suitable starting materials, i.e., oxides of zirconium and silicon or precursors thereof, a dopant for imparting the desired color, for instance praseodymium oxide for preparing a yellow colorant, as well as conventional additives, in particular so-called flux salts or mineralizers, in the desired ratio and calcining the mixture, typically at a temperature of 850°–1300° C. The product thus obtained is cooled, ground to an average particle size ($D_{50}$) of 10–30 $\mu$m and 100% <40 $\mu$m, washed out and dried.

As a flux salt or mineralizer, typically alkali metal chlorides and/or alkali metal fluorides are used, sometimes combined with greater or smaller amounts of oxides or halides of other metals. The most important activity of the mineralizer is to reduce the calcination temperature. Sometimes, rather large amounts of mineralizer of more than 10% by weight up to about 30% by weight are used. Due to such a large amount of mineralizer, much of the $SiO_2$ used is converted to volatile or water-soluble compounds and, accordingly, is not incorporated into the crystal structure of the colorant. This explains why in the literature sometimes even a relatively large excess of $SiO_2$ is included in the starting mixture, in combination with a large amount of mineralizer, while yet a ceramic colorant having the above-mentioned molar $ZrO_2/SiO_2$ ratio of about 1/1/ is obtained.

Further, the mineralizer affects the size of the colorants to be made. The point is that by an appropriate choice of the composition of the mineralizer, the growth of the colorants can be promoted so as to obtain the desired particle size as stated before.

To illustrate the above, reference is made to NL-A-7409381 or the corresponding patent specification FR-A-2 238 689. They relate to praseodymium-containing ceramic colorants based on zirconium dioxide/silicon dioxide, which have a finer yellow color because a further metal oxide, preferably an oxide of antimony, has been incorporated into the colorant. $ZrO_2$ and $SiO_2$ are utilized in a mole ratio of 1/1, but in the starting mixture according to the single Example, 36 g zirconium dioxide (0.29 mol) and 29 g silicon dioxide (0.48 mol) are used, i.e., a molar excess of silicon dioxide. This is associated with the large amount of mineralizer present in the starting mixture, viz., 31 g or 31% by weight, comprising 26 g sodium chloride and 5 g molybdenum trioxide, causing the excess of silicon dioxide to partly volatilize during calcination and to partly convert to compounds that are water-soluble and are washed out as the pulverized calcination product is washed free of salt.

Another composition for preparing yellow praseodymium-containing ceramic colorants based on zirconium silicate is disclosed in DE-A-2 642 143. According to the main claim, this known composition, i.e., the starting mixture, contains 0.8–1.4 mol silicon dioxide per 1 mol zirconium dioxide. The mineralizer consists of a combination of fluoride and chloride. According to the Examples, a maximum of 1.1 mol silicon dioxide per 1 mol zirconium dioxide is used in the starting mixture. Here, too, the molar ratio of zirconium dioxide to silicon dioxide in the final ceramic colorant will always be about 1/1.

Further, NL-A-287 743 discloses a method of preparing a yellow ceramic praseodymium-containing zirconium silicate pigment, in which a cerium compound is included in the starting mixture so as to maintain the highest oxidation state of the praseodymium and thereby to obtain better reproducibility of the yellow color produced. At the same time, the cerium imparts a pleasant orange tone to the pigment. Zirconium dioxide and silicon dioxide can be used in the starting mixture in various ratios, but in all Examples the molar ratio of zirconium dioxide/silicon dioxide in the starting mixture is about 1/1. Accordingly, the ceramic pigments disclosed here belong to the pure zirconium silicate type as do all the ceramic colorants based on zirconium silicate discussed so far.

Doped ceramic zirconium silicate pigments are also disclosed in FR-A-1 289 796 and 1 458 059; U.S. application Ser. Nos. 3,012,898; 3,025,178; 3,168,410; 2,992,123; 2,441,447; and DE-A-1 910 008. All of these publications report such weight ranges of zirconium dioxide on the one hand and silicon dioxide on the other as to include therein a molar excess of silicon dioxide. However, in fact they relate to the starting materials, which, as stated previously, does not signify anything with respect to the molar ratio zirconium dioxide/silicon dioxide in the pigment prepared. It appears from nearly all Examples, for that matter, that zirconium dioxide and silicon dioxide are used in the starting mixture in amounts by weight substantially corresponding to a molar ratio of zirconium dioxide to silicon dioxide of 1/1. Only formulation 7 of U.S. application Ser. No. 2,992,123 specifies amounts that correspond to a deviant molar ratio of zirconium dioxide to silicon dioxide, viz. 4.2/1, i.e., the starting mixture contains a considerable molar excess of zirconium dioxide. All of the publications discussed here are silent on the particle size or the fineness of the pigments prepared. However, from the fact that invariably reference is made to ceramic pigments and no other possibility of application is suggested, it may be concluded that all of these known pigments have a particle size of at least about 10 $\mu$m, as discussed hereinabove with reference to ceramic zirconium silicate colorants.

BE-A-661 595 discloses ceramic pigments based on zirconium dioxide, silicon dioxide and vanadium pentoxide having different color shades, depending on an additional color-providing metal component that is introduced into the pigment. As appears from the Examples, the molar ratio zirconium dioxide/silicon dioxide in the starting mixture is always about 1/1, except in formulation 10, where the molar ratio is $\frac{1}{4}$. However, the molar ratio of zirconium dioxide/silicon dioxide in the pigment prepared is not known and moreover this publication is concerned with a doped zirconium-vanadium silicate pigment, whereas the present invention relates to doped zirconium mixed silicate pigments, which, therefore, do not contain the vanadium component that is essential according to BE-A-661 595. Incidentally, the known doped zirconium-vanadium silicate pigment is designated as a ceramic pigment, from which it can only be concluded that a relatively coarse pigment is involved here, as discussed hereinabove.

FR-A-1 197 669, finally, discloses a method of preparing ceramic pigments having a particularly pleasant green color. In the preparation of these pigments, the starting material includes oxides of zirconium, silicon, tin and vanadium or precursors thereof. These oxides can be utilized in strongly varying amounts, but the highest $SiO_2/ZrO_2$ mole ratio specified is 3.8/1, being number N in Table 1. This, however, relates to the mole ratio of the starting materials, which does not signify anything with respect to the mole ratio in the final pigment, as discussed previously. It is further noted that FR-A-1 197 669 relates to zirconium-tin-vanadium silicate pigments, whereas a vanadium component is absent from the zirconium mixed silicate pigments now contemplated. Finally, FR-A-1 197 669 is concerned with the preparation of classic ceramic pigments, which are rather coarse-grained, as explained.

In the ceramic industry, developments are going on whereby glazes are fired onto a substrate in a shorter time than the conventional times of 8 hours or longer as used heretofore. In that case, the calcination time is, for instance, only about 2 hours or shorter. At present, there are even glazing techniques which permit calcination times of less than 0.5 hours. The colorants to be used here, however, pose a problem, in that the known ceramic zirconium silicate colorants, which, as stated, have a particle size of at least 10 $\mu$m, are too coarse. If one desires to grind them to finer particles, two problems are encountered. First, the grinding process is laborious on account of the great hardness of the zirconium silicate, and, secondly, the color strength or intensity decreases according as the colorant is ground to finer particles. The fact that pigments that are ground to a very high degree of fineness lose color strength is known from an article by S. Pajakoff, A. Vendl and G. Banik: "Zirconium Silicate Based High Temperature Pigments" in Interceram no. 4, pp. 488–490 (1980) (see page 489, right-hand column) and has also been signaled in an article by A. W. Martens in V.D.E.Fa Mitteilungen 31 (1983)H.3, pp. 37–47 (see page 39, left-hand column under C).

As a special branch of the ceramic industry, the glass industry may be mentioned, in particular the manufacture of packaging glass. It is often desired for packaging glass to be colored, so as to protect the food packaged and stored therein from the action of light, which would otherwise cause the food to age prematurely. In this application, the known coarse ceramic pigments often do not provide the desired homogeneous coloration. As stated previously, fine-grinding is difficult and leads to a considerable loss of color strength.

It has been attempted to avoid the loss of color strength during fine-grinding by using selective grinding techniques, in which only the coarse particles are ground fine whilst the finer particles are left intact as much as possible. In other words, the aim is to narrow the particle size distribution. However, these grinding techniques are laborious and nevertheless do not yield optimum results.

Accordingly, in the ceramic industry there is a great need for colorants of good color strength that can easily be obtained in a high fineness and then maintain their strong color. Those colorants should moreover exhibit good thermostability, so that they maintain their color strength even when exposed to the high temperatures conventional in ceramic processing. For their use in packaging glass, it is moreover of essential importance that the doped metal oxide is not released into the packaged food. Finally, it is further desired that the colorants can be prepared in a simple and reproducible manner, preferably from inexpensive raw materials.

Outside the field of the ceramic industry, there is a great need for such colorants as well, in particular in the plastics and rubber industry and in the manufacture of paint, printing ink and cosmetic products. The problem is that the known ceramic colorants based on zirconium silicate are too coarse-grained to be used there. If one desires to manufacture a product of the required fineness from such known coarse-grained product by grinding, the above-mentioned problems are encountered. The serious loss of color strength, in particular, is a great disadvantage. In addition, a product ground finely in this manner contains sharp crystalline fragments, which are highly abrasive, causing accelerated wear in the equipment used to process such product as a colorant in plastics, etc.

According to the invention, a completely new type of pigment is provided, which meets the above-described needs. The idea underlying the invention defies the generally accepted view with regard to ceramic pigments to the effect that only a small molar excess of silicon dioxide relative to zirconium dioxide is permitted if a stable pigment for ceramic purposes is to be obtained. Indeed, the present invention involves a deliberate choice for a considerable molar excess of silicon dioxide relative to the zirconium dioxide, viz., 1.5 to 36 mol silicon dioxide per 1 mol zirconium dioxide, with the silicon dioxide homogeneously incorporated into the crystal structure of the pigment.

Surprisingly, it has now been found that such pigments yet exhibit good heat stability and very good color strength and can be obtained in the desired high fineness or can easily be reduced to such high fineness, without such reduction leading to any appreciable decrease of the initial color strength or color intensity. The thermostability remains good as well. Accordingly, the new pigments according to the invention are particularly suitable for use in the ceramic industry, especially in the previously described advanced techniques where only short to very short calcination times are utilized, and in the glass industry, especially in the manufacture of packaging glass.

In addition, on account their above-mentioned properties and because they are little abrasive in very fine form, the new pigments according to the invention are particularly suitable for applications outside the ceramic field as well, in particular in plastics, rubber, paint, printing ink and cosmetics.

It may further be observed that the new pigments according to the present invention are easy to prepare and are relatively inexpensive, partly because of the large to very large excess of silicon dioxide, which can be introduced through an extremely cheap raw material.

The present invention, accordingly, is characterized in that the pigment has a $D_{50}$ particle size of 3 $\mu$m or less and comprises a mixed silicate based on zirconium dioxide, silicon dioxide and a doped color-providing metal oxide, whilst the molar ratio of zirconium dioxide/silicon dioxide deviates from the stoichiometric ratio and is in the range of 1/1.5-1/36, and the doped color-providing metal oxide is present in an amount of 1-25% by weight, calculated on the pigment.

The present invention further relates to a doped zirconium mixed silicate pigment as defined in the preceding paragraph, which, however, is coarser in that the $D_{50}$ particle size is greater than 3 $\mu$m, whilst the molar ratio of zirconium dioxide/silicon dioxide is in the range of 1/4.9-1/36 and preferably in the range of 1/6.2-1/36. For the preparation of this coarser zirconium mixed silicate pigment, however, it is likewise of essential importance to start from very fine starting materials having a particle size of less than 3 $\mu$m, as will be further described hereinafter. This coarser zirconium mixed silicate pigment is unsuitable for uses outside the ceramic field, such as the coloring of plastics, but it has proved to be suitable for incorporation in glass, for instance in packaging glass.

To designate the present new pigments, the term "mixed silicate" is used herein. The point is that not just the zirconium and the doped metal, but also the silicon, utilized in large to very large excess indeed, are incorporated into the silicious lattice structure. Accordingly, this lattice structure, at least the occupation of the lattice points by the different constituent elements, necessarily differs essentially from the previously mentioned known lattice or crystal structure of doped zirconium silicate based on the formula $ZrSiO_4$, being the only stable structure known heretofore. Surprisingly, is has now been found that the present mixed structure of different silicate forms also has a very stable structure.

The color of the present pigment is determined by the nature of the doped color-providing metal oxide, which is likewise very firmly incorporated into the crystal structure of the mixed silicate and not released therefrom in the course of time. The metal oxides involved are oxides of metals from the series of the transition metals and the rare earth metals. For more details about this, in particular also about the color provided by a given metal oxide, reference can be made to the previously cited article by Pajakoff, Vendl and Banik.

Initially, i.e., after washing of the sinter cake, the present pigment particles may have a strongly varying particle size, for instance a particle size of between 0.1 and 40 $\mu$m. The particle size as used herein indicates what percentage by weight of the particles have a given maximum diameter. $D_{50}=10 \mu$, for instance, means that 50% by weight of the particles have a diameter of 10 $\mu$m at most; $D_{90}=20 \mu$m means 90% by weight of the particles have a diameter of 20 $\mu$m at most. Whenever particle size or average particle size is mentioned herein without further specification, $D_{50}$ is meant. As stated, the initial size of the present pigment particles may vary to quite an extent, but this is only of minor importance.

It is important, however, that the initial pigment particles can easily be reduced by grinding in conventional grinding equipment so as to obtain a final pigment having a $D_{50}=3 \mu$m (often further characterized by a $D_{90}=7 \mu$m) or less, or even a $D_{50}=2 \mu$m (often further characterized by a $D_{90}=6 \mu$m) or less, and that the pigment thus obtained a very great color strength or color intensity. This is surprising and totally different from the observations made in the known ceramic pigments (see the previously cited articles). Surprisingly, the very finely ground pigment of very great color strength according to the present invention moreover exhibits very good heat stability, which makes it suitable for use in the ceramic industry, but it can also be incorporated as a colorant, for instance in plastics, rubber, paint, printing ink and cosmetic products. In the preparation of coarser pigment particles according to the invention, having a $D_{50}$ exceeding 3 $\mu$m, it may sometimes suffice to merely dis-agglomerate the pigment particles initially obtained, or they may be subjected to a less extensive grinding process.

Now follows a detailed discussion of the new pigments according to the invention, and of the preparation and the use thereof. These aspects will be discussed with reference to yellow praseodymium-containing zirconium mixed silicate pigments, but, in principle, the same characteristics, methods of preparation and possibilities of application likewise apply to zirconium mixed silicate pigments having a different color because a different color-providing metal oxide than praseodymium oxide is incorporated therein.

BRIEF DESCRIPTION OF THE DRAWING

For the description of the composition of the present new pigments, reference is made to the accompanying triangular diagram.

This diagram shows the concentrations of the essential components, calculated as oxide, expressed in % by weight. From the apex angle, a number of lines have been drawn to the base line. Viewed from left to right, these lines successively correspond to a molar ratio of zirconium dioxide/silicon dioxide of 1/1; 1/1.5; and 1/36, respectively.

The line 1/1 denotes the stoichiometric zirconium silicate. All known zirconium silicate pigments that are used in the ceramic industry are located on, or in the immediate vicinity of, this line. A specific pigment is located lower or higher on the 1/1 line according as it has been doped with less or more praseodymium oxide so as to obtain the desired yellow tint or yellow tone. If more than 25% praseodymium oxide is used, the pigment acquires more of a green-yellow tone.

The line 1/1.5 bounds the present range on the side of the lower $SiO_2$ content, but this lower content is already considerably higher than the $SiO_2$ content in the ceramic zirconium silicate pigments known to date. Indeed, as discussed above, a person of ordinary skill in the art of ceramics is of the opinion that even a minor molar excess of $SiO_2$ results in an unacceptable increase of the solubility of the pigment in a glaze melt. As a result, such a pigment was considered unsuitable for use in ceramics. Surprisingly, however, it has now been found that the present zirconium mixed silicate pigments containing a considerable molar excess of $SiO_2$ of at least 1.5/1, preferably at least 2.2/1 and most preferably even at least 3.3/1 exhibit good stability in a glaze melt. The preference for the range of the larger excess of $SiO_2$ of 2.2/1 or more is motivated in particular by the easy processability and the lower cost of raw materials, while yet an amply sufficient to very good color strength is obtained.

The line 1/36 in the accompanying diagram bounds the present range on the side of the maximum permissible $SiO_2$ content. If a higher $SiO_2$ content is used, the color decreases strongly because, in that case, too little zirconium is present to express the color-providing doping effect, in this case of praseodymium.

For the rest, the present range is bounded by the minimum and the maximum praseodymium oxide content. The minimum content is 1% (% by weight) because otherwise too little coloring is effected. The maximum content is 25% (also % by weight) because in the case of a higher content, the praseodymium oxide is insufficiently incorporated into the crystal structure and, moreover, the color tone is then substantially modified, changing to rather faded green-yellow tints. Also in the case where a metal oxide other than praseodymium oxide is used for doping, the same concentration range of 1-25% by weight applies for analogous reasons to those mentioned hereinabove.

Summarizing, the hatched trapezoid area in the appended triangular diagram represents the range according to the invention, it being further noted that, as appears also from the diagram, a minimum amount of approximately 4% of zirconium dioxide is necessary, that is, for the proper coloring and for the stability of the present pigment. Owing to the large to very large amount of silicon dioxide to be used, compared with the more expensive zirconium dioxide, the present pigments are considerably cheaper than the known ceramic pigments based on doped zirconium silicate.

Within the hatched trapezoid area, a further area is indicated for 3-8% praseodymium oxide. This range is preferred most because within that range deep-yellow, very strong color tints are obtained, which are maintained even when the pigments are ground to the high degree of fineness that is one of the characteristics of the present invention.

For preparing the present pigments, the starting materials known in the art of ceramics can be used. Preferably, oxides of zirconium and of silicon as well as of the doping metal, for instance praseodymium ($Pr_6O_{11}$), are used because these materials are available in ample quantities. But instead, or in combination therewith, any compound can be used that yields the metal ion in question under the calcination conditions. Such compounds are commonly referred to as precursors of the respective metal oxides. The starting materials may be of a quality and purity common in the ceramic industry, but it is of essential importance that they, as far as necessary, separately or together, are priorly ground to an average particle size ($D_{50}$) of less than 3 $\mu$m and preferably of even less than 2 $\mu$m. This operation can be carried out in conventional grinding apparatus, utilizing, as far as necessary, aids known in the grinding art.

Naturally, it is also possible to start from starting materials that already have the required fineness owing to the nature of the method of preparation utilized. As regards this last point, it may be observed that it is possible to use very fine dispersions or colloidal solutions of the starting materials or to priorly bring such dispersions or solutions together, so that in situ starting materials in a very finely divided form are obtained. Thus, the above-mentioned average article size ($D_{50}$) of less than 3 $\mu$m or even of less than 2 $\mu$m can easily be achieved without the necessity of carrying out a grinding operation.

For the preparation of the starting mixture, the above-mentioned starting materials as well as the necessary additives, in particular the mineralizer, are optionally reduced as discussed hereinabove and properly mixed so as to obtain a homogeneous mixture. If initially a wet mixture is prepared, it should be de-watered and dried and subsequently be properly homogenized. In any case, the ratios of the various components in the starting mixture are to be chosen such that the essential components in the final pigment are present in the previously specified amounts.

As a mineralizer for the preparation of the present pigments, preferably a mineralizer based on chloride and/or fluoride is used, for instance an alkali metal or ammonium chloride and/or fluoride. A comineralizer yielding good results in combination with chloride and/or fluoride, is a molybdenum compound, in particular molybdenum trioxide, of which only a small amount needs to be used. The point of this comineralizer is that it enables calcination at a relatively low temperature and moreover promotes the formation of a more homogeneous and stable lattice structure in the final pigment.

For preparing the present pigment, only a relatively small amount of mineralizer needs to be used, particularly in the case where the starting mixture has a high degree of fineness as discussed before. Particularly favorable results are achieved when the starting mixture to be calcined contains, as mineralizer, 0.1-9% by weight of a chloride and/or fluoride, preferably sodium chloride and/or sodium fluoride and, in addition, less than 1% by weight of a molybdenum compound, preferably molybdenum trioxide. The use of only a small amount of mineralizer has the additional advantage that only very little or practically no silicon dioxide is lost during calcination, so that the ratio of zirconium dioxide/silicon dioxide which is found in the final product is substantially the same as that which was used in the starting mixture.

The homogeneous dry mixture of the starting materials, having a very high degree of fineness, is subsequently calcined at a temperature typically between 700° and 1300° C., preferably between 800° and 900° C. and most preferably below 860° C. The heating time required for adjustment from the ambient temperature to the calcination temperature varies between 0.1 and 10 hours and is preferably between 0.5 and 2 hours. Typically, the mixture is held at the calcination temperature between 0.5 and 5 hours and preferably between 2 and 4 hours. The calcined product can be cooled, washed and dried in the usual manner. It may thereafter be ground to the particle size desired for the use contemplated. Alternatively, the calcined product can also be ground to the desired particle size directly upon cooling and only then be washed out and dried. On account of the minor amount of soluble substances remaining in the calcined product, washing may sometimes even be omitted.

It is further observed that the starting materials and the working conditions can be chosen and mutually adjusted such that a calcined product is obtained that only needs to be dis-agglomerated and can then be directly used for the intended applications, within or without the field of ceramics, because it already has the fineness required therefor without the necessity of carrying out a further grinding operation. This can be achieved by starting from starting materials having a very high degree of fineness, by using a relatively small amount of mineralizer and by calcining at a very low temperature, preferably below 860° C. The calcination time is preferably chosen to be short. A person of ordinary skill can then readily determine how these conditions can be mutually adjusted in a specific case so as to obtain a product that is suitable for the use contemplated.

According to another technique, it is also possible to first prepare an as yet undoped and hence white zirconium mixed silicate pigment, satisfying the present molar ratio of zirconium dioxide/silicon dioxide of 1/1.5–1/36. Such a pigment can be prepared in the manner discussed in detail hereinabove, with the exception that the color-providing metal oxide or a suitable precursor thereof can be omitted. Subsequently, a compound yielding the doping metal ions is added to the pigment thus prepared. For this purpose, a pigment and that compound may for instance be ground together and mixed to form a homogeneous mixture or the pigment may be sprinkled, sprayed or impregnated with a solution of that compound, or a combination of these techniques of grinding/mixing and using a solution may be used, optionally including fine-grinding. The pigment thus treated is then calcined under previously specified conditions, with the doping metal oxide being incorporated into the crystal structure of the zirconium silicate. All this should be controlled in such a manner that the amount of incorporated doped metal oxide is within the present concentration range of 1–25% by weight. After calcination, the pigment can be further treated in the manner previously described and, if necessary, be adjusted to the desired particle size. Naturally, it is also possible to introduce only a part of the doping metal oxide in the initial preparation of the zirconium mixed silicate pigment and subsequently to introduce the rest in the manner described in this paragraph.

Depending on the starting materials chosen, the apparatus used and the method of preparation chosen, a person of ordinary skill can easily determine what grinding conditions, mixing ratio, mixing time, heating time, calcination temperature and duration and further working conditions lead to optimum results in a particular case and with a view to a particular use of the pigment prepared. In any case, it is surprising that it is thus possible to prepare pigment particles in a simple, inexpensive and reliable manner, for instance a yellow pigment having an initial $D_{50}$ of 10 μm or less, having directly a $D_{50}$ of 3 μm or less, and which exhibit a very good color strength that is at least equal to that of the much coarser known ceramic pigments. Even after dis-agglomeration and optional grinding of the present color particles of agglomerates thereof to a $D_{50}$ of 3 μm or less, the pleasing intensely yellow color is maintained. According to the present invention, it is even possible to obtain, for instance, yellow pigment particles having a $D_{50}$ of less than 2 μm and an eminently useful yellow color.

The above-described characteristics of the present pigments, i.e., their color strength, their fineness and their stability, are of great importance for the uses contemplated in the ceramics industry, but most certainly outside that field as well, and in particular in plastics, rubber, paint, printing ink and cosmetics. Good color strength and high thermal stability are particularly important for ceramic applications. For the above-mentioned more recent ceramic techniques involving only short to very short calcination times, the high particle fineness is also of importance. For the other applications, i.e., outside ceramics, the good color strength and the high particle fineness are of particular importance, as well as the minor abrasive action, which prevents wear of the processing installations. Since the present pigment particles exhibit sufficiently high thermal stability for ceramic applications, their thermal stability is naturally more than adequate for the above-mentioned other uses, where the thermal load is considerably less (not exceeding about 500° C.).

The present zirconium mixed silicate pigments can therefore be used for ceramic applications. In such an application, the pigments, having the desired particle size, which is determined in particular by the ceramic technique to be used, and in the desired concentration, which is typically in the range of 1–8%, are added to and homogeneously mixed with a conventional glaze for manufacturing bright or cloudy or opaque glaze layers. Such glazes are generally known and commercially available. They are typically composed of a mixture of silicates in an aqueous medium. The mixture thus formed is applied, for instance by brushing, to a suitable substrate, for instance a clay tile, in a thin layer, whereafter the article is fired in an oven. The temperature and duration of firing are determined by the specific glazing technique, but in any case the present pigments appear to exhibit high thermostability, by which is meant that it has been found that they are stable up to firing temperatures of about 1100° C.

Another important ceramic application relates to the manufacture of glass, in particular of packaging glass. For that purpose, a zirconium mixed silicate pigment according to the invention having a $D_{50}$ of 3 μm or less, can be added in an amount of 0.5–5% by weight to a standard soda-lime-packaging glass composition. From this, a glass melt is formed at a conventional temperature, for instance about 1450° C. It appears that the pigment is then incorporated into the glass melt, rapidly, for instance in 10 to 20 min, and homogeneously, without causing cloudiness, bubble formation or deglazing. From the glass melt, a bottle, for instance, can subsequently be manufactured, which is homogeneously colored and which does not release the doped metal component, not even when the glass is subjected to severe lixiviation tests. When a yellow praseodymium-containing zirconium mixed silicate pigment according to the invention is thus incorporated into a beer glass, for instance, this glass acquires a yellow-green color and the beer proves to retain its taste much longer, probably because the yellow pigment protects the beer against the detrimental action of light. The ready processability of the present pigment in a glass melt can perhaps be explained by the molar excess of silicon dioxide, but it is surprising that the present pigment maintains its color strength at the very high temperature utilized. It is pointed out that the present zirconium mixed silicate pigment having a particle size of $D_{50}$ greater than 3 $\mu$m can also be successfully utilized in a manner described hereinabove, likewise yielding the favorable results mentioned.

A first very important application of the present zirconium mixed silicate pigment outside the ceramic field is in plastics, to give them the desired color. These plastics may be both thermoplastic and thermosetting plastics and examples include: polyvinyl chloride, low-density and high-density polyethylene, polypropene, polystyrene, etc. With the present pigments, mixtures of two or more plastics can be colored as well. The application of the present pigments in plastics is typically carried out by first mixing the pigment having a particle size of $D_{50}=3$ $\mu$m or less, preferably having a $D_{50}=2$ $\mu$m or less, in a high concentration with a plastic which is preferably miscible with the plastics to be finally colored. Such a colored concentrate is commonly referred to as color concentrate or master batch. These color concentrates mostly comprise more than 15% by weight of pigment and are usually processed in amounts of 0.1 to approximately 4% in the final plastics. As a result, a concentration of 0.05 to approximately 2% pigment is obtained in the final product.

The manufacture of a color concentrate can be carried out by mixing the pigments with the plastics in the melt, using conventional mixing apparatus, such as rollers and kneaders and, more particularly, compounder extruders, yielding a homogeneous granulate. While mixing the pigments to form a color concentrate, additives can be added which facilitate the dispersion of the pigment in the high-viscosity plastics and which sometimes improve the mechanical properties, the stability and the processability of the final product. Such additives consist of commercially available internal and external lubricants, thermal stabilizers, surface-active substances, dispersing aids, coupling agents, UV stabilizers, etc. However, it is also possible to add these additives or a number of them during the subsequent manufacture of the final colored plastics product.

The color concentrate thus obtained, for instance in the form of a granulate, is then added in the desired amount, for instance to obtain a final pigment concentration of about 2%, to the plastics to be colored and homogeneously mixed therewith at an increased temperature. The warm mixture can then be molded into the desired shape, so that plastics articles of a good, uniform and stable color are obtained.

The techniques for processing pigments in plastics, among which natural and synthetic rubber may be counted as well, are generally known. Accordingly, the above description is only intended as an elucidation of these generally known techniques. For more details, reference can be made to the extensive literature, for instance to EP-A-0 054 832, 0 225 799 and 0 328 219, DE-B-2 435 513, U.S. application Ser. No. 4 608 401 and GB-B-2 227 739.

Outside ceramics, there are numerous other fields of application where the present pigment can be utilized with success. In the applications involved here, the pigment is invariably exposed only to temperatures that are much lower than the temperatures utilized in ceramic applications, i.e., temperatures typically not exceeding about 500° C. Thus, heat stability is always ensured. Further, in the applications involved, a strong color with a very fine and ecologically sound pigment is important.

The basic principle of such applications is that, by methods conventional in the relevant art, the pigment or a suitable concentrate thereof is homogeneously mixed with a vehicle, whereafter the basic material thus colored is optionally moulded into a desired shape, depending on the application contemplated. These applications include the use in paint and printing ink, both water-based and organic solvent-based, where the final pigment concentration is higher or even considerably higher than in the previously described application in plastics and rubber. In paint and printing ink, the pigment concentration is typically between 6 and 35%, depending on the type of paint or printing ink. A further interesting application relates to cosmetic products. On account of their high degree of fineness and their being harmless to health, the present pigments are eminently suitable to be processed in appropriate concentrations in cosmetic products, such as lipstick, eye shadow and nail polish. For more details about these applications and about how pigments can be utilized therein, reference can be made to the extensive literature in the relevant field. The present invention is further explained and illustrated in and by the following examples.

EXAMPLE 1

45.2 kg zirconium dioxide ($ZrO_2$), 44.2 kg silicon dioxide ($SiO_2$), 4.9 kg praseodymium oxide ($Pr_6O_{11}$) and 0.7 kg molybdenum trioxide ($MoO_3$) are mixed together. To the mixture obtained, a mixture consisting of 2.5 kg sodium chloride and 2.5 kg sodium fluoride is added. In an industrial mill, the total mixture is dry-ground to an average particle size ($D_{50}$) of <2 $\mu$m, whereafter the mixture is intensively homogenized in a shaking apparatus.

In an oven, 1 kg of the mixture obtained is brought to a temperature of 820° C. and held at this temperature for 3 hours, followed by cooling. The sintered cake is washed in water and dis-agglomerated by stirring, whereafter the powder is recovered and dried.

The dry powder thus obtained is a zirconium mixed silicate pigment doped with praseodymium oxide, having a molar ratio of zirconium dioxide/silicon dioxide of $\frac{1}{2}$ and a praseodymium content of 5.1%. The dry powder is an intensely yellow colored pigment, whose color value was measured with a spectrophotometer "Spectrogard Automatch Color System" of Gardner Scientific Company. For carrying out the measurement, C-light was irradiated at 45° and observation occurred at 10°. The sample was measured in a glass cuvette belonging to the apparatus. The powder was pressed down in the cuvette until a constant measured value was obtained. According to the HUNTER scale, the following color value was measured:

Lh=79.06
ah=5.54
bh=46.89

The particle size distribution of the pigment was measured in water using a "Granulometer type HR 850". The following particle size was found: $D_{50}=9$ $\mu$m and $D_{50}=20$ $\mu$m.

Through grinding, the pigment can easily be reduced to a particle size of $D_{50}=3$ $\mu$m and then still has an intensely yellow color, as appears from the following measurement of the color value:
Lh=82.46
ah=1.76
bh=44.65

Even after the pigment has been ground more finely to a $D_{50}$ value of $2\pm0.15$ μm, it still has an eminently useful yellow color. The following color value was measured:
Lh=82.35
ah=1.25
bh=42.77

Further, the cake obtained from the calcining process may, after cooling, be ground directly to a $D_{50}=3$ μm or even more finely, to be subsequently washed and dried. In that case, too, an intensely yellow colored pigment is obtained.

The yellow pigment having a $D_{50}=3$ μm or less, obtained according to this Example, is eminently suitable for use in the ceramic field as well as in plastics, rubber, paint, printing ink and cosmetic products.

EXAMPLE 2

34.3 kg zirconium dioxide ($ZrO_2$), 55.4 kg silicon dioxide ($SiO_2$), 4.75 kg praseodymium oxide ($PrO_{11}$) and 0.66 kg molybdenum trioxide ($MoO_3$) are mixed together. To the mixture obtained, a mixture consisting of 2.43 kg sodium chloride and 2.43 kg sodium fluoride is added. In an industrial mill, the total mixture is dry-ground to an average particle size ($D_{50}$) of <2 μm, whereafter the mixture is intensively homogenized in a shaking apparatus.

In an oven, 1 kg of the mixture obtained is brought to a temperature of 820° C. and held at this temperature for 3 hours, followed by cooling. The sintered cake is washed in water and dis-agglomerated by stirring, whereafter the powder is recovered and dried.

The dry powder thus obtained is a zirconium mixed silicate pigment doped with praseodymium oxide, having a molar ratio of zirconium dioxide/silicon dioxide of 1/3.3 and a praseodymium content of 4.9%. The dry powder is an intensely yellow colored pigment, on which, with a spectrophotometer, the following color value was measured in the manner described in Example 1:
Lh=79.31
ah=4.34
bh=43.50

The particle size distribution of the pigment was measured in water using a "Granulometer type HR 850". The following particle size was found: $D_{50}=8.5$ μm and $D_{90}=19$ μm.

Through grinding, the pigment can easily be reduced to a particle size $D_{50}=3$ μm and a $D_{90}=7$ μm and then still has an intensely yellow color, as appears from the following measurement of the color value:
Lh=82.61
ah=1.35
bh=42.90

Even after the pigment has been ground more finely to a $D_{50}$ value of $2\pm0.15$ μm, it still has an eminently useful yellow color, as appears from the following color value measured:
Lh=83.38
ah=0.39
bh=40.99

Further, the cake obtained from the calcining process may, after cooling, be ground directly to a $D_{50}=3$ μm or even more finely, to be subsequently washed and dried. In that case, too, an intensely yellow colored pigment is obtained.

The yellow pigment having a $D_{50}=3$ μm or less, obtained according to this Example, is eminently suitable for use in the ceramic field as well as in plastics, rubber, paint, printing ink and cosmetic products.

EXAMPLE 3

30.6 kg zirconium dioxide ($ZrO_2$), 59.6 kg silicon dioxide ($SiO_2$), 4.51 kg praseodymium oxide ($Pr_6O_{11}$) and 0.63 kg molybdenum trioxide ($MoO_3$) are mixed together. To the mixture obtained, a mixture consisting of 2.3 kg sodium chloride and 2.3 kg sodium fluoride is added. In an industrial mill, the total mixture is dry-ground to an average particle size of <2 μm, whereafter the mixture is intensively homogenized in a shaking apparatus.

In an oven, 1 kg of the mixture obtained is brought to a temperature of 820° C. and held at this temperature for 3 hours, followed by cooling. The sintered cake is washed in water and dis-agglomerated by stirring, whereafter the powder is recovered and dried.

The dry powder thus obtained is a zirconium mixed silicate pigment doped with praseodymium oxide, having a molar ratio of zirconium dioxide/silicon dioxide of ¼ and a praseodymium content of 4.6%. The dry powder is an intensely yellow colored pigment, on which, using a spectrophotometer, the following color value was measured in the manner described in Example 1:
Lh=78.97
ah=4.90
bh=44.74

The particle size distribution of the pigment was measured in water using a "Granulometer type HR 850". The following particle size was found: $D_{50}=9.5$ μm and $D_{90}=21$ μm. Through grinding, the pigment can easily be reduced to a particle size $D_{50}=3$ μm and a $D_{90}=7$ μm and then still has an intensely yellow color, as appears from the following measurement of the color value:
Lh=81.91
ah=1.77
bh=43.66

Even after the pigment has been ground more finely to a $D_{50}$ value of $2\pm0.15$ μm, it still has an eminently useful yellow color, as appears from the following color value measured:
Lh=82.57
ah=0.89
bh=41.89

Further, the cake obtained from the calcining process may, after cooling, be ground directly to a $D_{50}=3$ μm or even more finely, to be subsequently washed and dried. In that case, too, an intensely yellow colored pigment is obtained. The yellow pigment having a $D_{50}=3$ μm or less, obtained according to this Example, is eminently suitable for use in the ceramic field as well as in plastics, rubber, paint, printing ink and cosmetic products.

EXAMPLE 4

22.5 kg zirconium dioxide ($ZrO_2$), 67.8 kg silicon dioxide ($SiO_2$), 4.0 kg praseodymium oxide ($Pr_6O_{11}$) and 0.7 kg molybdenum trioxide are mixed together. To the mixture obtained, a mixture consisting of 2.5 kg sodium chloride and 2.5 kg sodium fluoride is added.

The total mixture is pulverized and further processed and analyzed in the manner described in Example 1.

An intensely yellow colored pigment was obtained, having a molar ratio of zirconium dioxide/silicon dioxide of 1/6.2 and a praseodymium content of 4.1%.

The following color value and particle size distribution were measured:

| Lh = 87.3 | $D_{50}$ = 12.1 μm |
| ah = −7.5 | $D_{90}$ = 23.0 μm |
| bh = 48.1 | |

After grinding, the following color value and particle size distribution were measured:

| Lh = 90.1 | $D_{50}$ = 2.8 μm |
| ah = −8.4 | $D_{90}$ = 5.5 μm |
| bh = 40.1 | |

The yellow pigment having a $D_{50}$=2.8 μm, obtained according to this Example, is eminently suitable for use as a pigment in plastics, rubber, paint, printing ink and cosmetic products.

EXAMPLE 5

16.9 kg zirconium dioxide ($ZrO_2$), 74.2 kg silicon dioxide ($SiO_2$), 3.2 kg praseodymium oxide ($Pr_6O_{11}$) and 0.7 kg molybdenum trioxide are mixed together. To the mixture obtained, a mixture consisting of 2.5 kg sodium chloride and 2.5 kg sodium fluoride is added. The total mixture is pulverized and further processed and analyzed in the manner described in Example 1.

An intensely yellow colored pigment was obtained, having a molar ratio of zirconium dioxide/silicon dioxide of 1/9 and a praseodymium content of 3.3%.

The following color value and particle size distribution were measured:

| Lh = 88.2 | $D_{50}$ = 12.2 μm |
| ah = −8.4 | $D_{90}$ = 27.0 μm |
| bh = 46.3 | |

After grinding, the following color value and particle size distribution were measured:

| Lh = 91.3 | $D_{50}$ = 2.9 μm |
| ah = −8.7 | $D_{90}$ = 5.8 μm |
| bh = 38.4 | |

The yellow pigment having a $D_{50}$=2.9 μm, obtained according to this Example, is eminently suitable for use as a pigment in plastics, rubber, paint, printing ink and cosmetic products.

EXAMPLE 6

9.4 kg zirconium dioxide ($ZrO_2$), 82.5 kg silicon dioxide ($SiO_2$), 2.4 kg praseodymium oxide ($Pr_6O_{11}$) and 0.7 kg molybdenum trioxide are mixed together. To the mixture obtained, a mixture consisting of 2.5 kg sodium chloride and 2.5 kg sodium fluoride is added. The total mixture is pulverized and further processed and analyzed in the manner described in Example 1.

An intensely yellow colored pigment was obtained, having a molar ratio of zirconium dioxide/silicon dioxide of 1/18 and a praseodymium content of 2.4%.

The following color value and particle size distribution were measured:

| Lh = 89.5 | $D_{50}$ = 15.9 μm |
| ah = −9.8 | $D_{90}$ = 36.0 μm |
| bh = 42.1 | |

After grinding, the following color value and particle size distribution were measured:

| Lh = 93.1 | $D_{50}$ = 2.96 μm |
| ah = −8.2 | $D_{90}$ = 6.0 μm |
| bh = 29.7 | |

The yellow pigment having a $D_{50}$=2.96 μm, obtained according to this Example, is eminently suitable for use as a pigment in plastics, rubber, paint, printing ink and cosmetic products.

EXAMPLE 7

4.95 kg zirconium dioxide ($ZrO_2$), 86.95 kg silicon dioxide ($SiO_2$), 2.4 kg praseodymium oxide ($Pr_6O_{11}$) and 0.7 kg molybdenum trioxide are mixed together. To the mixture obtained, a mixture consisting of 2.5 kg sodium chloride and 2.5 kg sodium fluoride is added. The total mixture is pulverized and further processed and analyzed in the manner described in Example 1. An intensely yellow colored pigment was obtained, having a molar ratio of zirconium dioxide/silicon dioxide of 1/36 and a praseodymium content of 2.4%.

The following color value and particle size distribution were measured:

| Lh = 90.8 | $D_{50}$ = 18.2 μm |
| ah = −10.9 | $D_{90}$ = 35.0 μm |
| bh = 37.6 | |

After grinding, the following color value and particle size distribution were measured:

| Lh = 94.5 | $D_{50}$ = 2.9 μm |
| ah = −7.3 | $D_{90}$ = 5.9 μm |
| bh = 22.5 | |

The yellow pigment having a $D_{50}$=2.9 μm, obtained according to this Example, is eminently suitable for use as a pigment in plastics, rubber, paint, printing ink and cosmetic products.

EXAMPLE 8

100 g of a yellow pigment obtained according to one of the Examples 1-3, having a particle size of $D_{50}$=3 μm or less, is mixed with 100 g of a standard high-density or low-density polyethylene on a two roll compounding mixer at 180° C. The mixture is homogenized for 5 min, whereafter the sheet is cooled to room temperature. Then the sheet is reduced to granules having a maximum size of 3 mm. During these operations, the pigment does not discolor nor does it cause any discoloration or decomposition of the polymer. Thus, a master batch containing 50% pigment is obtained.

4 g of the granules obtained is added to a new amount of 100 g of the previously mentioned polyethylene and the mixture is again homogenized on a two roll compounding mixer at 180° C. for 5 min. The warm mixture is then taken off the roller and transferred to a plate press, where the mixture is pressed to form a plate of a thickness of 3 mm. The plate has a homogeneous appearance and contains 2% pigment, uniformly distributed through the plastics mass.

The yellow color of the pigment is fully maintained after these operations and the plate obtained is comparable in terms of color and quality with, for instance, crates or household articles from polyethylene.

EXAMPLE 9

Examples 9 and 10 relate to the use of a pigment according to the invention in an opaque ceramic glaze.

The pigment obtained according to Example 3 is reduced to an average particle size ($D_{50}$) of 2.67 μm and 100% <10 μm. To a glaze mixture manufactured in a conventional manner, based on glaze type Vo 63437 of Fa Reimbold & Strick at Köln (a glaze rendered opaque with white zirconium silicate), 5% by weight of the reduced pigment is added and properly dispersed therein. The resultant aqueous dispersion of pigmented glaze is applied to a ceramic tile in a layer of a thickness of 0.6 mm and fired in a ceramic oven at 1050° C. for 8 hours.

The glaze obtained has a thickness of 0.3 mm and has the following color value, measured with the spectrophotometer mentioned in Example 1:

Lh = 88.8
ah = −8.7
bh = 37.8

A comparative test with a yellow commercial pigment based on doped ceramic zirconium silicate of the type K 4458 of Fa Reimbold & Strick yields, under entirely identical test conditions and using the same pigment concentration, the following measured color value:

Lh = 90.1
ah = −10.0
bh = 35.9

This shows that the pigment according to the invention exhibits a better yellow value and a less green color.

Accordingly, the reduced pigment according to the invention appears to be very useful for ceramic applications and is stable in the conventional glazes. This is surprising because the ceramic pigments used heretofore exhibit a considerable loss of color strength when this particle size is used.

EXAMPLE 10

The pigment as obtained according to Example 3 is further reduced to an average particle size ($D_{50}$) of about 1.87 μm.

When this pigment is incorporated in a glaze under identical conditions to those used in Example 9, the following color value of the glaze obtained is measured:

Lh = 89.1
ah = −8.8
bh = 37.3

These values show that the glaze, owing to the reduction of the pigment to a particle size of less than 2 μm, has suffered substantially no loss of color, thereby distinguishing itself sharply from the conventional ceramic glazes, which suffer considerable loss of color strength when comparable particle sizes are used. In addition, the present pigment exhibits a lower green value, which is also advantageous in the ceramic art.

EXAMPLE 11

This Example relates to the use of a pigment according to the invention in glass.

Unground yellow pigment obtained according to Example 4 ($D_{50}$ = 12.1 μm) is added in an amount of 2% by weight to a standard soda-lime-packaging glass composition. The composition is then introduced into a conventional oven for the manufacture of glass, where, at a temperature of about 1450° C., a homogeneous glass melt is formed in about 30 minutes.

From the glass melt, samples are formed which, after cooling, are ground and polished to form glass plates having a thickness of about 2 mm. These plates have a bright yellow-green color and exhibit no cloudiness, bubble formation or deglazing phenomena. In spectral absorption measurements, a strong absorption is observed in the range of 420–480 nm, so that the glass is eminently suitable for packaging beer, for instance.

It is surprising that the present pigment is so easily incorporated into glass and yields so good a coloring effect therein, since the known ceramic zirconium silicates having a molar ratio of zirconium dioxide/silicon dioxide of about 1/1, even after being ground finely, are hard and slow to dissolve in a glass melt and yield a considerably weaker coloring effect.

When, instead of the unground yellow pigment obtained according to Example 4, the ground pigment having a $D_{50}$ = 2.8 μm is utilized in the glass in the manner described hereinabove, the pigment appears to be incorporated into the glass melt even more rapidly, and likewise the above-mentioned favorable effects are achieved.

What we claim is:

1. A doped zirconium mixed silicate pigment, wherein the pigment has a particle size $D_{50}$ of 3 μ or less and comprises a mixed silicate based on zirconium dioxide, silicon dioxide and a doped color-providing metal oxide, whilst the molar ratio zirconium dioxide/silicon dioxide deviates from the stoichiometric ratio and is in the range of 1/1.5–1/36, and the doped color-providing metal oxide is present in an amount of 1.–25% by weight, calculated on the pigment.

2. A doped zirconium mixed silicate pigment as claimed in claim 1, wherein the pigment has a particle size $D_{50}$ of 2 μm or less.

3. A doped zirconium mixed silicate pigment as claimed in claim 1, wherein the molar ratio of zirconium dioxide/silicon dioxide is in the range of 1/2.2.–1/36.

4. A doped zirconium mixed silicate pigment as claimed in claim 1, wherein the doped color-providing metal oxide comprises one or more oxides or metals selected from the group of the transition metals and the rare earth metals.

5. A doped zirconium mixed silicate pigment as claimed in claim 4, wherein the doped color-providing metal oxide comprises praseodymium oxide so as to obtain a yellow pigment.

6. A doped zirconium mixed silicate pigment as claimed in claim 1, wherein the doped color-providing metal oxide is present in an amount of 3–8% by weight, calculated on the pigment.

7. A doped zirconium mixed silicate pigment, wherein the pigment has a particle size $D_{50}$ of more than 3 μm and comprises a mixed silicate based on zirconium dioxide, silicon, dioxide and a doped color-providing metal oxide, whilst the molar ratio zirconium dioxide/silicon dioxide deviates from the stoichiometric ratio and is in the range of 1/4.9–1/36, and the doped color-providing metal oxide is present in an amount of 1–25% by weight, calculated on the pigment.

8. A doped zirconium mixed silicate pigment as claimed in claim 7, wherein the doped color-providing metal oxide comprises one or more oxides of metals selected from the group of the transition metals and the rare earth metals.

9. A doped zirconium mixed silicate pigment as claimed in claim 8, wherein the doped color-providing metal oxide comprises praseodymium oxide so as to obtain a yellow pigment.

10. A doped zirconium mixed silicate pigment as claimed in claim 7, wherein the doped color-providing metal oxide is present in an amount of 3–8% by weight, calculated on the pigment.

11. A method of preparing a doped zirconium mixed silicate pigment wherein the pigment has a particle size of $D_{50}$ of 3 µm or less and comprises a mixed silicate based on zirconium dioxide, silicon dioxide and a doped color-providing metal oxide, whilst the molar ratio zirconium dioxide/silicon dioxide deviates from the stoichiometric ratio and is in the range of 1/15–1/36, and the doped color-providing metal oxide is present in an amount of 1–25% by weight, calculated on the pigment, wherein suitable starting materials for zirconium oxide and silicon oxide and for the color-providing metal oxide, as well as a mineralizer, are brought together in amounts adjusted to the desired final product, and processed to form a homogeneous mixture of fine products, said starting materials being fine-ground, if necessary, so that the particle size of the homogeneous mixture of fine particles is less than 3 µm, whereafter the mixture obtained is calcined, cooled, optionally washed and dried, the calcination product, if necessary and as far as necessary, being further subjected to a grinding treatment so as to obtain the desired particle size.

12. A method as claimed in claim 11, wherein the starting materials are fine-ground, if necessary, so that the particle size of the homogeneous mixture of fine particles is less than 2 µm.

13. A method as claimed in claim 11, wherein less than 10% by weight of mineralizer is used in the starting mixture.

14. A method as claimed in claim 13, wherein in the starting mixture, as mineralizer, 0.1–9% by weight of a chloride and/or fluoride in combination with less than 1% by weight of a molybdenum compound is used.

15. A method as claimed in claim 11, wherein the calcination is carried out at a temperature of less than 860° C.

16. A method of preparing a doped zirconium mixed silicate pigment wherein the pigment has a particle size $D_{50}$ of more than 3 µm and comprises a mixed silicate based on zirconium dioxide, silicon dioxide and a doped color-providing metal oxide, whilst the molar ratio zirconium dioxide/silicon dioxide deviates from the stoichiometric ratio and is in the range of 1/4.9–1/36, and the doped color-providing metal oxide is present in an amount of 1–25% by weight, calculated on the pigment, wherein suitable starting materials for zirconium oxide and silicon oxide and for the color-providing metal oxide, as well as a mineralizer, are brought together in amounts adjusted to the desired final product, and processed to form a homogeneous mixture of fine particles, said starting materials being fine-ground, if necessary, so that the particle size of the homogeneous mixture of fine particles is less than 3 µm, whereafter the mixture obtained is calcined, cooled, optionally washed out and dried, the calcination product, if necessary and so far as necessary, being further subjected to a grinding treatment so as to obtain the desired particle size.

17. A doped zirconium mixed silicate pigment as claimed in claim 1, wherein the molar ratio of zirconium dioxide/silicon dioxide is in the range of 1/3.3–1/36.

18. A doped zirconium mixed silicate pigment as claimed in claim 7, wherein the molar ratio of zirconium dioxide/silicon dioxide is in the range of 1/6.2–1/36.

19. An article of manufacture having as a colorant a doped zirconium mixed silicate pigment, wherein the molar ratio zirconium dioxide/silicon dioxide deviates from the stoichiometric ratio and is in the range of 1/1.5–1/36, and the doped color-providing metal oxide is present in the amount of 1–25% by weight, calculated on the pigment.

20. The article of manufacture of claim 19, wherein said article is chosen from the group consisting of ceramic articles and glass articles.

21. The article of manufacture of claim 20, wherein said article is packaging glass.

22. The article of manufacture of claim 19, wherein said article is chosen from the group consisting of plastics, rubber, paint, printing ink and cosmetic products.

23. An glass article having as a colorant a doped zirconium mixed silicate pigment, wherein the molar ratio zirconium dioxide/silicon dioxide deviates from the stoichiometric ratio and is in the range of 1/4.9–1/36, and the doped color-providing metal oxide is present in the amount of 1–25% by weight, calculated on the pigment.

24. The glass article of claim 23, wherein said article is packaging glass.

* * * * *

UNITED STATES PATENT AND TRADEMARK OFFICE
CERTIFICATE OF CORRECTION

PATENT NO.   :   5,275,649

DATED        :   January 4, 1994

INVENTOR(S)  :   Erich A.E. Linke; Cornelis H. Zwart; and Adrianus D. Smout

It is certified that error appears in the above-identified patent and that said Letters Patent is hereby corrected as shown below:

Column 18, line 36, "$D_{50}$ of 3$\mu$ or" should read --$D_{50}$ of 3$\mu$m or--

Signed and Sealed this

Fourteenth Day of June, 1994

Attest:

BRUCE LEHMAN

*Attesting Officer*                *Commissioner of Patents and Trademarks*